June 20, 1944.  S. A. JANSSON  2,351,684
ELECTRIC REMOTE CONTROL SYSTEM
Original Filed Nov. 16, 1938   9 Sheets-Sheet 1
*Fig. 1.*
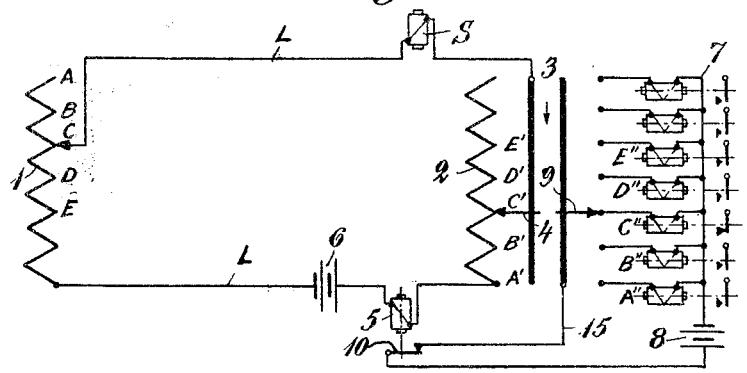
*Fig. 2.*  *Fig. 3.*  *Fig. 4.*
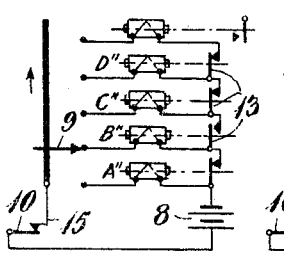 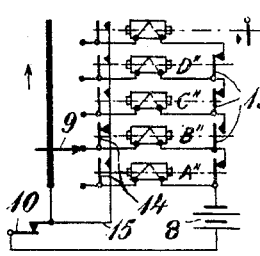 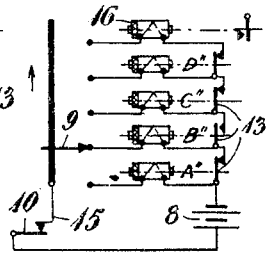
*Fig. 5.*
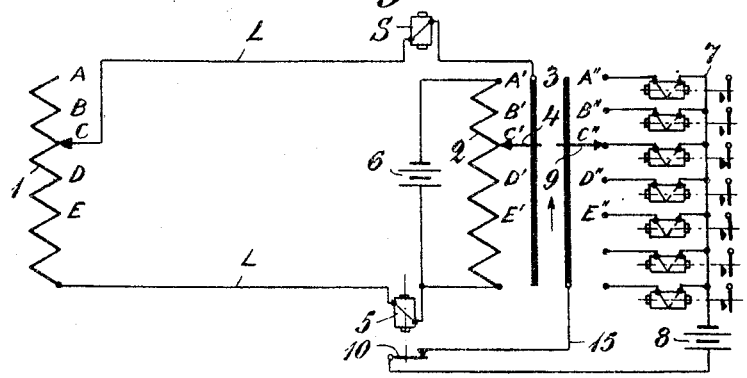
Inventor,
S. A. Jansson
By: Glascock Downing & Seebold
Attys.

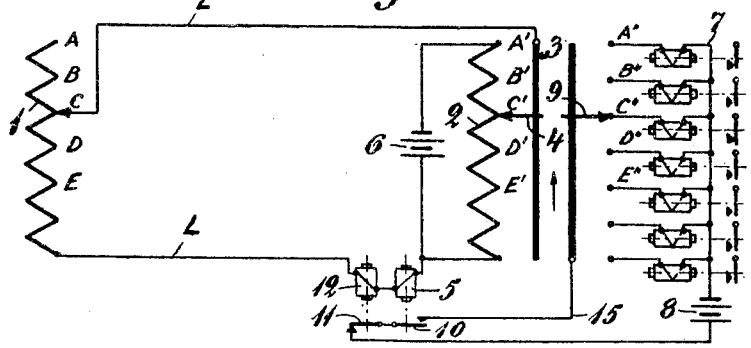
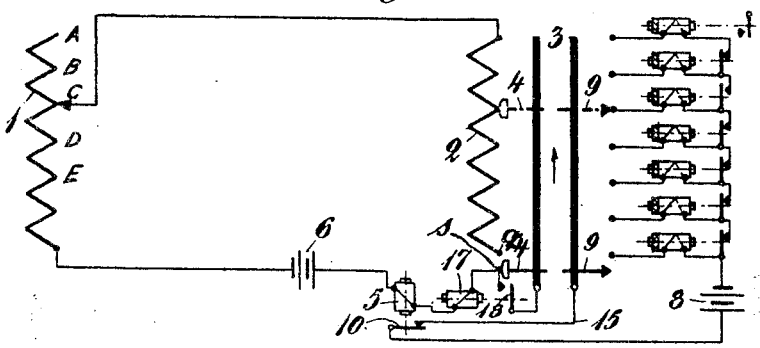
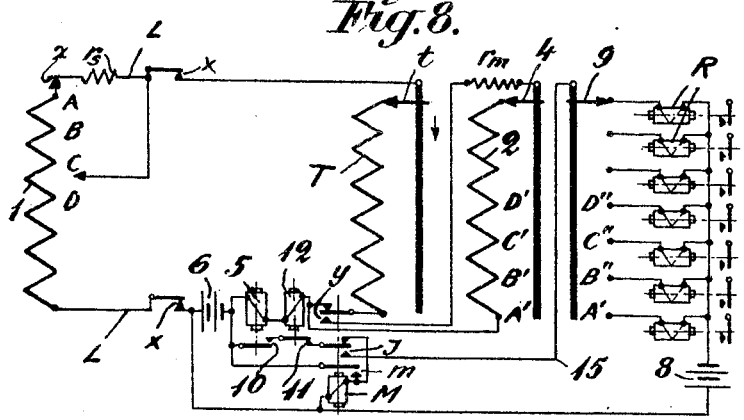

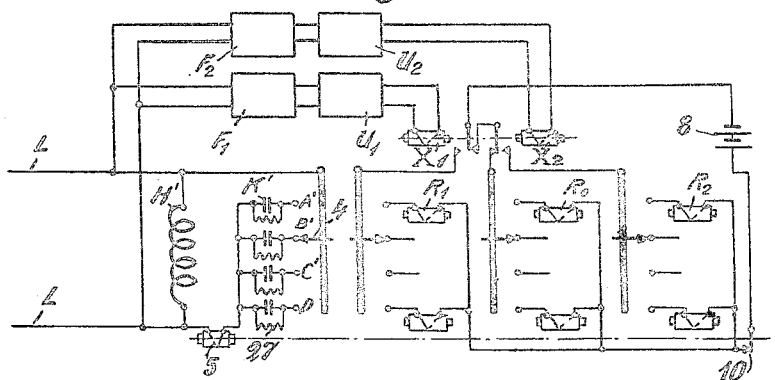
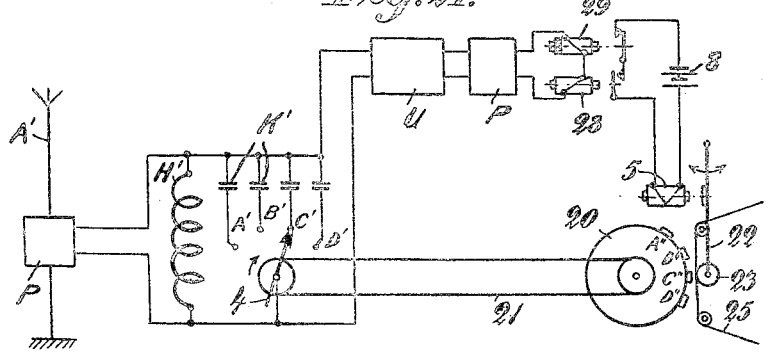
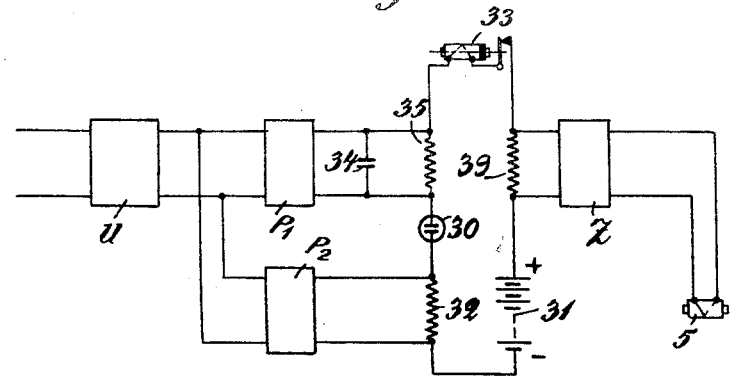

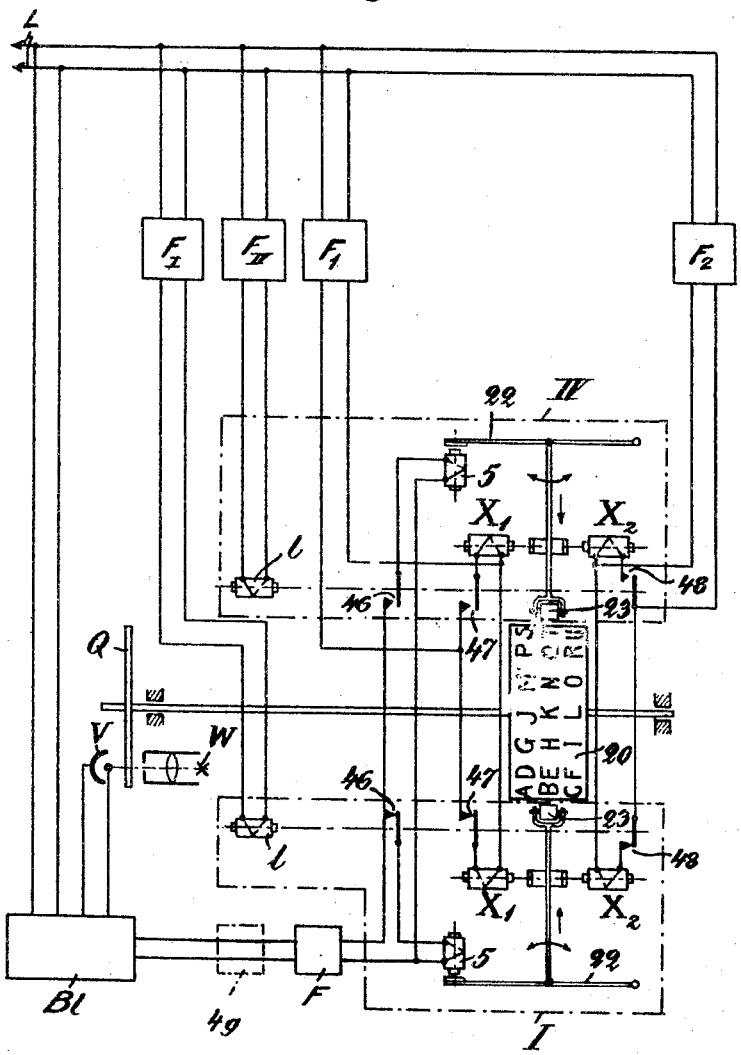

Patented June 20, 1944

2,351,684

UNITED STATES PATENT OFFICE 2,351,684

ELECTRIC REMOTE-CONTROL SYSTEM

Sven Anders Jansson, Stockholm, Sweden

Original application November 16, 1938, Serial No. 240,842, now Patent No. 2,262,766, dated November 18, 1941. Divided and this application September 8, 1941, Serial No. 410,089. In Sweden November 18, 1937

5 Claims. (Cl. 179—16)

My invention relates to electric remote control systems, and it relates more particularly to systems of said kind in which a selectively adjustable sender is employed to supervise a receiver comprising a tuning member or the like adapted to be adjusted within a certain tuning range for the purpose of tuning or otherwise regulating a selective circuit or the like at the receiver side in correspondence with the selective condition of the sender. It is a general object of my invention to provide for selective receipt of impulses from the sender without having to resort to any synchronizing of the sender and the receiver and without the use, at the receiver, of a plurality of circuits or the like which are fixedly tuned in advance each to one of a number of different sender signals or impulses. The invention may be applied for instance in automatic telephone systems to effect a simplification of the selector arrangements, particularly the arrangements for the transmission of impulses from the subscriber's stations to the exchange. Furthermore, the invention may advantageously find application in high speed telegraph systems, particularly in teleprinters or type printing telegraphs, the invention comprising also special arrangements for increasing the telegraphing speed in such systems.

My invention will be better understood from the following description when considered in connection with the accompanying drawings, showing various embodiments of the invention. In the drawings:

Figure 1 shows a circuit arrangement which can be employed for transmitting and selectively receiving direct current impulses;

Figures 2, 3 and 4 show different embodiments of details of said circuit arrangement;

Figures 5 and 6 show two other circuit arrangements for direct current;

Figure 7 is a diagram showing a modification of the circuit arrangement according to Figure 1;

Figure 8 is a further modification of Figure 1;

Figures 17 to 25 show various other applications of the invention.

Figure 9:
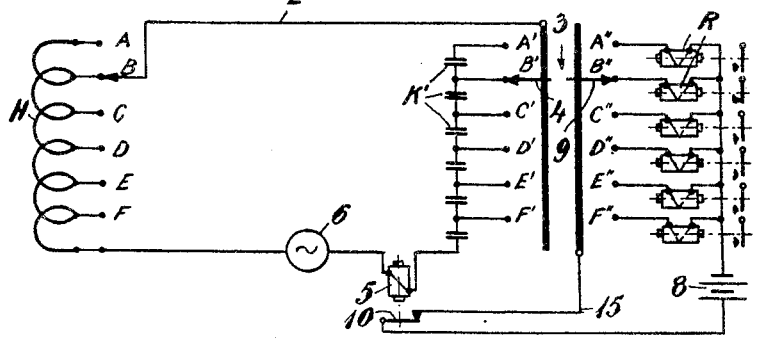
Figures 9, 10, 11 and 12 show circuit arrangements according to the invention, in which alternating current is used for the transmission of impulses.

In the circuit arrangement according to Figure 1, which may be employed for instance in automatic telephone systems to establish connection between the subscriber's stations and the exchange or for other remote control purposes, there is provided at the sender, thus for instance at a subscriber's station, a resistance 1 which is adapted to be adjusted step by step, by way of example by means of a key set, the various tappings or setting positions of said resistance being designated in the figure with the letters A, B, C . . . The resistance 1 is arranged to be connected to a variable and preferably equally great resistance 2 at the receiver over a junction line L including a current source 6. The resistance 2 is arranged to be varied by means of an adjustable tuning member 3 or the like, said tuning member consisting in the shown example of a contact arm 4 which is movable along a contact bar, said contact arm 4 being displaceable by means of an intermittently operating motor or driving means, not shown, in such a manner that upon receipt of each selector impulse or sign the motor is started by a starting relay S included in the line circuit, the motor then moving the contact arm 4 through its entire regulating range, causing the arm to pass over a number of contacts A', B', C' . . . connected with the tappings of the resistance 2. Said tappings corresponding to the setting positions A, B, C . . . of the resistance 1 at the sender in such a manner that the sum of the portions of the resistances 1 and 2 included in the circuit will always have a certain predetermined value when the movable contacts of the resistances occupy mutually corresponding setting positions, for example A and A', B and B' . . . The contact arm 4 is mechanically coupled with or otherwise movable in synchronism with another contacting or selector arm 9 which passes, during the passage of the contact arm 4 over the row of contacts A', B', C' . . . over a row of corresponding selector contacts A'', B'', C'' . . ., thereby preparing in advance, for each setting of the contact arm 4 in any of the contact positions A', B', C' . . ., an indicating circuit containing a current source 8 by connecting up successively at the contacts A'', B'', C'' . . . a number of relays or indicating members R, said relays being connected over a common conductor 7 to one pole of the current source 8. Corresponding to each relay or indicating member R there is thus a setting position A', B', C' . . . for the contact arm 4 and consequently also a setting position A, B, C . . . at the sender. In the schematic figure the contacting or selector arrangement 3 is shown as having a linear selector movement, but in practice it may preferably be constructed as a rotating selector which moves through its whole regulating range for each revolution. The indicating circuit is normally interrupted at a contact 10 of a limiting current relay 5 included in the line L, the sensitivity of said relay being so determined that the relay will attract its armature only when the line current has reached a value, which corresponds to the total resistance of the line circuit when the resistances 1 and 2 have mutually corresponding setting positions, thus A and A', B and B' . . .

As long as the switching arrangement is inoperative, the contact arm 4 as well as the selector arm 9 will occupy a starting position (the uppermost position in the figure), in which the whole resistance 2, or at least the portion thereof comprising the whole regulating range, is included in the line circuit, said circuit being to begin with interrupted at the sender side. When the resistance 1, for instance by depressing a key, is set for instance in the setting position C, the line circuit will be closed, causing the starting relay S, which responds to the lowest operating current in the line, to operate and start the motor, the contact arms 4 and 9 then beginning to move downwards, i. e. in the direction of the arrow shown in Figure 1. The total resistance of the line will then be reduced successively, causing the current through the relay 5 to increase. When the arm 4 reaches the setting position C' the sum of the parts of the resistances 1 and 2 which are included in the circuit will reach the predetermined value and consequently the relay 5 will operate and close the indicating circuit which at said moment includes the relay R connected to the selector contact C'', said relay marking in any known manner the character corresponding to the impulse. When thereafter the contact arm continues to the contact positions D', E' . . . the relay 5 will be maintained energized under the influence of the increasing line current and the indicating circuit will thus remain closed. The relays R corresponding to the said following contacts D', E' . . . will then, if no special provisions are made, also become energized over the corresponding selector contacts D'', E'' . . . In some cases this will not involve any inconvenience in that when receiving telegraphic signs one need not read any other characters than those which are marked through the first actuated relay R during each complete selector movement. On the other hand, it is often desirable or necessary to prevent operation of the next relays. This can be made in many different ways. For instance, the relays R may be combined with a mechanical locking mechanism which permits one relay only to operate during each selecting movement, or the armatures of the relays can be arranged upon operation mechanically to actuate the contact 10 and cause opening thereof, or else the relays R may be provided with series connected opening contacts for the indicating circuit 15. Figure 2 shows an example of such a connection, the opening contacts 13 being mutually so connected that upon operation of certain relay the opening contact appertaining thereto will disconnect the following relays from the indicating circuit. The operated opening contact must then, of course, be maintained open as long as the contact 10 remains closed, i. e. until the contact arm 4 has completed its stroke. This can be effected in different manner, for instance as shown in Figure 3 by providing each relay R with a holding contact 14 which on operation of the relay will hold the relay connected in the indicating circuit 15, or else by making the relays slow-upon-release as in Figure 4, where each relay R is provided with a short-circuiting winding copper ring 16. For each relay the time lag upon release is determined with regard to the number of the following relays.

The embodiment according to Figure 5 differs from the embodiment shown in Figure 1 only therein that the resistance 2 is arranged as a voltage divider or potentiometer and is connected in parallel with the line current source 6. It should be observed that the voltage divider represents a current source the voltage of which may be varied step by step. The various sections of the resistance 2 between the tappings A', B' . . . may be dimensioned in such a manner that the current in the line circuit will assume always a certain predetermined value for all corresponding settings of the resistances 1 and 2, i. e. for each setting A, A' or B, B' . . . In Figure 5 the contact arm 4 moves from below and upwards, as indicated by the arrow. Instead of the potentiometer one may use, of course, only a battery having terminals or tappings connected to the contacts A', B' . . .

Figure 6 shows a connection according to Figure 5 which is provided with an arrangement for the same purpose as the one shown in Figures 2 to 4, viz. an arrangement for preventing operation of the relays R following after the relay which corresponds to the incoming impulse. In Figure 6 said arrangement consists of a cut-off relay 12 included in the line L in series with the relay 5, the opening contact of said relay being included in the indicating circuit 15 in series with the contact 10 and the sensitivity of said relay being so adjusted that the relay will operate as soon as the line current exceeds the current to which the relay 5 responds.

If desired, the two relays 5 and 12 in Figure 6 may be substituted by a single relay having two contact positions, viz. a first contact position for closing the indicating circuit and a second contact position for successively opening said circuit, the relay being adapted to remain in the first contact position long enough to give the relay R included in the circuit for the moment time to respond.

In place of the relay 5 a resistance can be included in the line L, in that the voltage drop across the resistance may be utilized for operating the relays R. The indicating circuit is then assumed to be connected to the ends of the resistance, if desired through an amplifier, and the relays or indicating members R should then be so adapted that they do not respond to a voltage lower than the one produced across the resistance when the latter is passed by the line current occurring when the sender and the receiver occupy corresponding positions.

Under certain conditions a common current source can be used for the line circuit L and the indicating circuit 15. If desired the latter circuit may be replaced by a mechanical releasing device, the relay 5 being then arranged to move together with the contact arm 4 so as to be brought, during the movement of the latter, successively into operative position opposite to various indicating members corresponding to the relays R in Figures 1 to 6, so that upon operation of the relay the indicating member being for the moment right opposite the same will become actuated.

It has been assumed above that the contact arrangement or selector is started and travels through its regulating range once for each impulse. However, the arrangement can also be devised for continuous operation of the motor, so that the selector will travel through its regulating range in uninterrupted repeated sequence. In the circuit arrangements described special precautions must then be made, however, to prevent a faulty signalling if the resistance 1 in the sender should happen to become connected to the line immediately after the selector has passed the corresponding contact position. In said case there would be set up immediately a sufficiently strong current in the line to energize the relay 5. For the purpose of preventing such actuation of the receiver as would involve the marking of a faulty character an arrangement of one kind or another must be provided to prevent the receiver from operating until the selector reaches the correct contact position during the following revolution. In the connection according to Figure 6 the cut-off relay 12 is capable of fulfilling said function on continued operation of the selector, because said relay responds simultaneously with the relay 5 in such cases when, immediately upon the closing of the circuit, the line current assumes a value which is greater than the current corresponding to the corresponding settings of the sender and the receiver. In the connections according to Figures 1 and 5, on the other hand, special provisions are required for said purpose when the selector is to operate continuously. Figure 7 shows an example thereof in a circuit arrangement according to Figure 1 comprising relays R made in accordance with Figure 4. The connection between the contact bar of the contact device 4 and the line L is here normally interrupted and it is controlled by an extra relay 17 included in the line circuit, said relay being of such sensitivity that it will respond to the weakest operating current in the line. At the beginning of each revolution of the selector the contact arm 4 connects momentarily together two contacts a and k, the line circuit provided that it is prepared by the connection into the circuit of a portion of the resistance 1 at the sender, being then closed through the relay 17 which is energized and connects at its contact 18 the contact bar of the contact arm 4 to the line, the armature of the relay being thereafter held in operated position during the entire revolution. If the contact arm should start its revolution without the relay 17 being actuated, the receiver would be inoperative under all conditions during said whole revolution.

If the connections described are used in automatic telephone systems for connecting subscriber's stations to the exchange and for transmitting the digit impulses of the subscriber, differences occurring with respect to the resistance of the various subscriber's lines must be compensated for through the provision of additional resistances, so that all subscriber's stations which are arranged to be connected to the same selector resistance 2 will get the same total normal resistance. Figure 8 shows a connection provided with an arrangement for automatic compensation of the differences with respect to the resistance of the various subscriber's lines. At the sender, that means at a subscriber's station, there is included a resistance $r_s$ in series with a contact z connected between the branch of the subscriber's line L adapted to be connected to the various tappings A, B, C . . . and the free end of the resistance 1, said contact z being controlled by the microphone hook. At the receiver, that means at the exchange, the resistance 2 and the appertaining contact device is not connected directly to the line L, as in Figures 1 or 6, but it can be connected to the line over a normally open contact y of an auxiliary relay M in series with a variable additional resistance T provided with a motor-driven contact arm t. As in Figure 6 a cut-off relay 12 is connected into the line circuit in series with the line battery 6 and a relay 5. The closing contact 10 of the relay 5 and the opening contact 11 of the relay 12 are mutually connected in series, and said contacts may alternately form part of the circuit for the auxiliary relay M or of the releasing circuit 15. The mode of operation is the following:

When the subscriber removes his microtelephone the hook contact z is closed, causing the line relay appertaining to the subscriber's line to close the line contacts x in the exchange receiver, the line circuit being then closed over the battery 6, the relays 5 and 12, a resting contact of the relay M, and the resistance T. The contact arm t appertaining to said resistance is put in motion, the resistance T, which is assumed to have its greatest value at the start, then decreasing successively, in some cases continuously, until its total resistance included in the line circuit has been reduced to a predetermined value at which the relay 5 operates. At said moment the additional resistance T will have the value required to compensate for the deviation of the line resistance from the above mentioned normal resistance. The auxiliary relay M is connected into circuit at the contact 10 locking itself at its holding contact m and bringing about the mechanical disconnection of the contact arm t and the stopping thereof in the position reached, the resistance k is connected into the line circuit at the operating contact y of the relay, the contacts 10 and 11 are connected into the releasing circuit 15 at the contact j, and the relay 5 will drop its armature again because of the resistance of the line circuit having been increased with the resistance 2 or part thereof and with a resistance $r_m$ connected in series therewith, said latter resistance being equal to $r_s$. After the line resistance has now obtained the desired normal value, the selecting operation can take place in the manner described above in connection with Figure 6. After the subscriber has depressed all the keys corresponding to the digits of the desired number the holding of the auxiliary relay M is interrupted in arbitrary known manner.

In the embodiments described above the direct current source 6 of the line circuit may be substituted by an alternating current source, the relays 5, 12 and 17 having then to be so designed, of course, as to respond to alternating current.

In using alternating current it is advantageous, on the other hand, to substitute frequency dependent impedances for the frequency independent resistances 1 and 2 and to utilize in connection therewith the possibility of obtaining resonance. Figure 9 shows schematically such a connection which can be considered to have been developed from the connection according to Figure 1 by exchanging the ohmic resistance 1 at the sender for an inductance H and the resistance 2 at the receiver for a continuous row of condensers K. The inductance H is provided with tappings A, B, C . . . just as was the case with the resistance 1, and at the receiving side the contacts A', B', C' . . . are connected to the condenser terminals in such a manner that, in accordance with the selected contact position of the arm 4, a greater or smaller capacity will be included in series with the line L and the inductance H. In this case the starting relay may be dispensed with. The contact positions at the sender and at the receiver correspond to each other two and two as in the cases described above. To the greatest inductance value, i. e. to the setting position A at the sender, corresponds the smallest capacitive value at the receiver, i. e. the position A', and the various part inductances and part capacities are so selected that in all mutually corresponding setting positions of the sender and of the receiver the product of the inductance and the capacity will have a predetermined value corresponding to the fixed frequency of the alternating current source 6, so that for each such setting the oscillatory circuit composed of the inductance H, the line L, and the capacity K, will be in resonance. The relay 5 is an alternating current relay having such a sensitivity as to operate only when the circuit is substantially in resonance. If thus, for instance, the sender is set on B, the relay 5 will attract its armature when, during its movement in the direction of the arrow in Figure 9, the contact arm 4 reaches the corresponding contact position B', and will drop its armature when the contact arm leaves said contact position. The special arrangements shown in Figures 2 to 4 are in said case unnecessary even if the selector is driven continuously, as was assumed in this case. The alternating current source 6 may be situated at the sender or at the receiver. If desired it may be included directly between the line branches, i. e. in parallel with the inductance and the capacity in the oscillatory circuit. The frequency dependent impedance at the sender or at the receiver respectively need not be a single inductance or capacity but may consist of an arbitrary combination.

Figure 10:
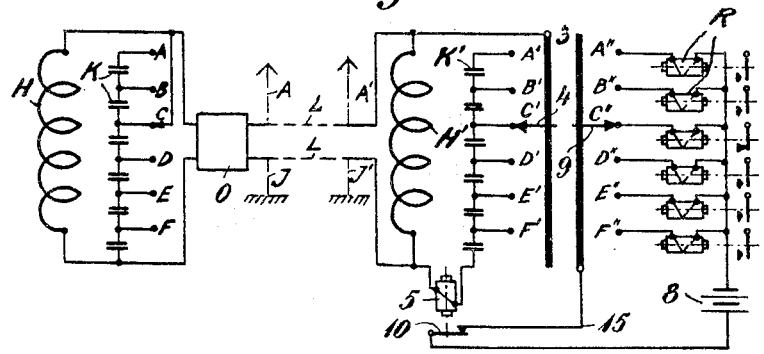

Figure 10 shows another resonance connection in which there is used as an alternating current source an oscillator O which is disposed at the sender and the frequency of which may be varied step by step, the line L being connected at the receiver side to a parallel resonance circuit consisting of a fixed inductance H' and of a capacity formed by condensers K' adapted to be connected into circuit in the same manner as in Figure 9, said parallel resonance circuit being adapted to be varied in steps in correspondence with the various frequencies. The oscillator is assumed to be a tube oscillator the frequency determining oscillatory circuit of which is composed of a fixed inductance H and of a variable capacity which is formed in the same manner as the capacity at the receiver side by a series of part condensers K between which the contacts A, B, C . . . are connected. The oscillator may be replaced, of course, by any other alternating current generator having a controllable frequency. The variable oscillatory circuits may be composed in any arbitrary manner.

Figure 11:
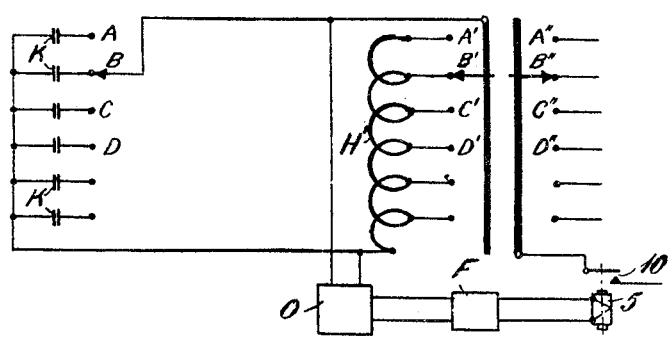

In the embodiment according to Figure 11 the oscillator O is situated at the receiver side and its frequency determining oscillatory circuit is formed by the line L in combination with a stepwise variable capacity provided at the sender and a stepwise variable inductance H provided at the receiver. The selection of the capacity at the sender side is effected in this case by alternatively connecting-in one at a time of a number of equally great condensers K', said condensers being at one side connected in common to one line branch and being at the other side connected individually each to an appertaining one of the setting contacts A, B, C . . . At the output side the oscillator is connected to the alternating current relay 5 through a filter F which permits passage of a certain definite frequency or narrow frequency band. After the variable capacity at the sender has been set in the setting position B, for instance, the natural frequency of the frequency determining circuit will assume successively, during the selecting movement of the contact arm 4, different values corresponding to the different contact positions A', B', C' . . . the condensers K and the sections of the inductance H' are so selected that at all corresponding setting positions A, A', B, B' . . . of the sender and of the receiver the oscillator frequency will be equal to the frequency or will fall within the narrow frequency band which is passed by the filter F. The relay 5 will then become energized each time the contact arm 4 takes up a position corresponding to the setting of the sender and will drop its armature as soon as the arm leaves said position.

Figure 12:
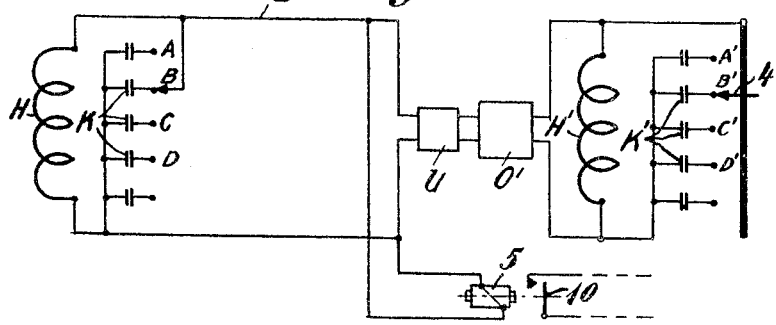

In the connection according to Figure 12 the oscillator O' is also situated at the receiver, but its frequency determining circuit is here limited to the receiver and consists in the shown example of a fixed inductance H' and of a capacity which is adjustable step by step by means of the contact arm 4, said capacity being composed of condensers K' which are adapted to be alternately connected into circuit. At its output side the oscillator is connected to the line L through an amplifier U, a relay 5 being also connected to said line. The sender consists of a parallel resonance circuit comprising a fixed inductance H and a capacity which is adapted to be varied by steps and the different sections of which are connected to the contacts A, B, C . . . in the same manner as in Figure 11. If desired the inductance H may be arranged instead at the receiver. The parallel resonance circuits at the sender and at the receiver are tuned in the same manner in mutually corresponding setting positions, thus in the setting positions A, A', B, B' . . . When this occurs, during the movement of the contact arm 4, a resonance voltage will be set up across the terminals of the alternating current relay 5, causing the relay to attract its armature and to close the contact 10, whereafter the operation will proceed in the same manner as in the previously described embodiment. The oscillatory circuits in Figures 11 and 12 may consist of any suitable combination of impedances.

In the connection according to Figure 12 the oscillator O' and the appertaining frequency determining circuit may be substituted, if desired, by some other alternating current generator having an adjustable frequency.

The remote control according to the invention may be effected over a wireless connection just as well as over a line connection. For example, the line L in the connection according to Figure 10 may be substituted by a radio connection, as indicated with dotted lines, both the sender and the receiver being then connected, instead of to the line, at one side to an antenna A or A' respectively and at the other side to earth J or J' respectively. The oscillator O at the sender, which when using a line connection generally has a comparatively low frequency, must of course, when using a wireless connection, consist of a high frequency oscillator, and at the receiver side a detector, if desired in connection with an amplifier, may be included between the resonance circuit H', K' and the relay 5. In said alternative embodiment of the connection according to Figure 10 unmodulated high frequency oscillations are thus sent out, the frequency of said high frequency oscillations varying with the setting of the frequency determining oscillatory circuit H, K.

Figure 13:
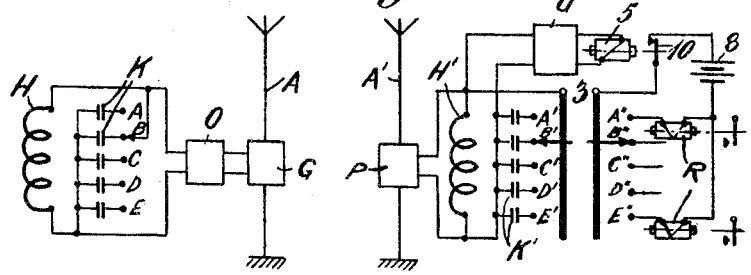
Figures 13, 14, 15 and 16 show applications of the invention in wireless systems, Figure 16 showing at the same time an application of the invention in a type printing telegraph.

Figure 13 shows another embodiment utilizing wireless signal transmission. According to said figure there is connected to the sender antenna A a high frequency oscillator G having a fixed frequency, the oscillations of said oscillator being modulated in arbitrary known manner by means of low frequency oscillations supplied from a low frequency oscillator O provided with a frequency determining oscillatory circuit H, K composed in the same manner as the corresponding circuit in Figure 10. The receiver antenna A' is connected through a detector P and, if desired, an amplifier, to the parallel resonance circuit H', K' of the receiver, said circuit being adapted to be tuned in correspondence with the sender circuit H, K. The releasing relay 5 is included at the output side of a low frequency amplifier U connected to the parallel resonance circuit H', K', said relay consisting of an alternating current relay or of a direct current relay. In the latter case a further detector may be included between U and 5. In high speed telegraphing it has been found to be advantageous to connect great resistances in parallel with the condensers K' at the receiver.

Figure 14:
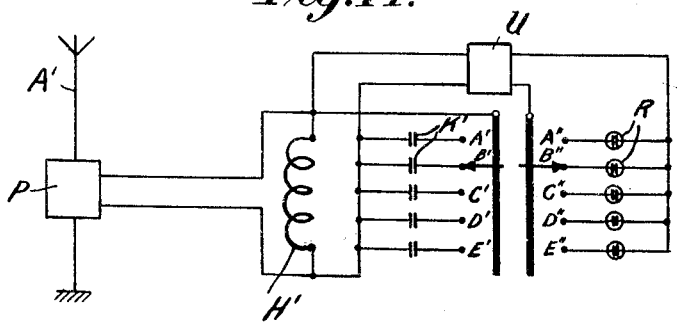

Figure 14 shows a modification of the receiver according to Figure 13. In this case the indicating relays R consist of glow discharge lamps. The releasing relay 5 has been dispensed with as being unnecessary, the glow discharge lamps R serving themselves as releasing relays. Although this is not shown on the drawings, the glow discharge lamps are preferably provided with a biasing voltage lying somewhat below the terminal voltage. When, during the movement of the selector, the oscillatory circuit H', K' comes into resonance with the modulating frequency of the signal incoming from the sender, either the positive or the negative half-waves in the resonance voltage amplified by the low frequency amplifier U will add themselves to the biasing voltage of the corresponding glow discharge lamp, the glow discharge lamp being ignited as soon as the resulting voltage has reached the ignition voltage.

Figure 15:
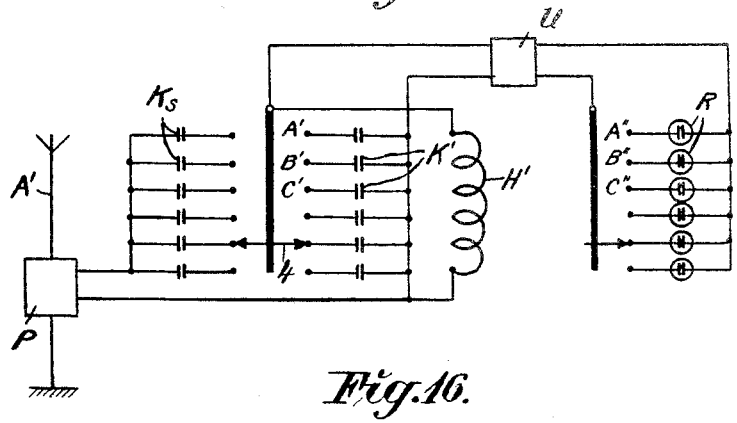

If the differences between the frequencies to which the oscillatory circuit H', K' of the receiver can be tuned are relatively great, the amplitudes of the resonance voltages may become considerably different at different tuning. The difference with respect to resonance amplitude can be equalized in various ways, however. For example, the strength of the signals may be adapted at the sender in suitable manner to the frequency, or else equalizing impedances of different magnitude may be connected into the different selector positions at the receiver. Figure 15 shows an example in which the equalizing impedances consist of condensers $K_s$ which are slotted to the various selector positions and are adapted in the selecting position to be connected-up in series with the resonance circuit. In other respects the connection according to Figure 15 is in agreement with Figure 14. In certain cases it may be advantageous to select the additional impedances so that the lower frequencies, which have a comparatively long building-up time, will get a correspondingly greater resonance amplitude, so that they will become capable of obtaining a certain definite releasing voltage in as short a time as the higher frequencies. Another manner of securing the same result is to let the amplification of the amplifier U vary under control of the selector, for example by means of a potentiometer included in the circuit at the input side of the amplifier, or through regulation of the biasing voltage of one or more control grids in the amplifier.

Figure 16:
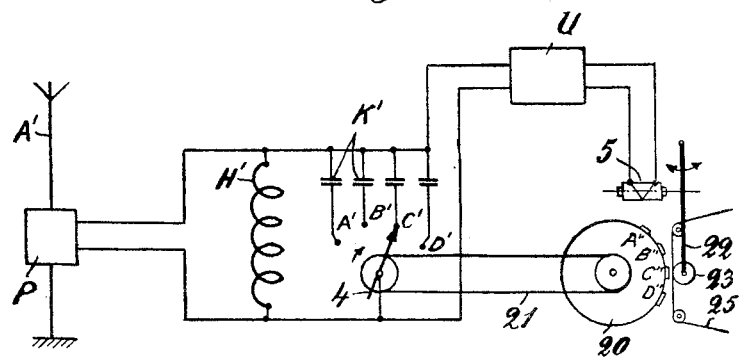

Figure 16 shows an application of the invention in a type printing telegraph system. Only the receiver is shown in the figure, since the sender may be assumed to be designed in the same manner as in Figure 13. As in Figure 13 the receiver antenna A' is connected through a detector P to the parallel resonance circuit H', K', which is adapted to be tuned in accordance with the different modulating frequencies of the signal. The contact arm 4 is assumed to be rotatable which, as above mentioned, is also assumed to be the case in the other embodiments, although for the sake of simplicity the contact devices of the selector have been shown schematically in the earlier figures with a linear selector movement. The releasing relay 5 is connected through the low frequency amplifier U to the parallel resonance circuit. A type wheel 20, which around its circumference is provided with printing types A", B" . . ., each corresponding to one of the contacts A', B' . . ., is by means of a suitable transmission 21, shown in the figure for the sake of simplicity as a belt transmission, coupled with the rotatable shaft of the contact arm 4, so that in each setting position of the contact arm the type wheel will take up an angular position corresponding thereto, the corresponding type then occupying a position right opposite to a printing roller 23 supported by an arm 22. The arm 22 is connected with the armature of the releasing relay 5, so that upon energization of the relay the printing roller will be pressed against the opposite type causing said type to be printed on a paper strip 25 which moves between the type wheel and the printing roller. For the purpose of increasing the printing speed the printing roller is preferably arranged to rotate continuously with the same peripheral speed as the type wheel, in that, for example, it may be coupled with the type wheel through a friction coupling. In said embodiment the printing roller 23 represents a counterpart to the contact 10 in the previous figures, and the printing wheel 20 forms the selector which is driven in synchronism with the contact device 4 and which travels all through its selecting range each time the tuning circuit H', K' runs through its tuning range. If the various resonance frequencies have considerably different building-up times the contact segments A', B' . . . should have in said embodiment as well as in the previously shown embodiments a varying width in order to give the lower frequencies more time to become built up. In the embodiment according to Figure 16 the types A", B" . . . should then be unevenly spaced around the circumference in such a manner that the types corresponding to the lower frequencies will have greater mutual distances than the types corresponding to the higher frequencies in order that each type shall have reached its printing position at the very moment when the corresponding frequency has reached a sufficient amplitude to effect release of the printing relay 5.

Through special provisions, for example through the use of suitably dimensioned additional impedances according to Figure 15, it is possible to secure, however, that the lower frequencies reach the required releasing amplitude in about the same time as the higher frequencies, in which case the contact segments A', B' . . . can be made of equal width and the types in Figure 16 be equally spaced around the circumference of the type wheel.

Alternatively, the printing process may be replaced by a photographic process known per se.

In the embodiments above described, in which alternating current or high frequency oscillations are used for the signal transmission, the receivers are designed in the manner of so called straight radio receivers, i. e. the signals are transformed at the receiver directly to releasing impulses. If desired, one may subject the signals received, prior to their transformation into releasing impulses, to a frequency transformation. In some cases, for example if the transmitting medium (cable or aerial line) does not permit transmission of frequencies above a certain relatively low limit, it may be suitable to effect at the receiver a doubling or multiplying of the frequency for the purpose of utilizing the shorter time of oscillation of the higher frequencies, thereby rendering possible a more rapid sequence of characters. The higher frequencies obtained, which in this case bring about the release of the indications, should be as free as possible from higher and lower harmonics (remaining fundamental oscillations).

Figure 17:
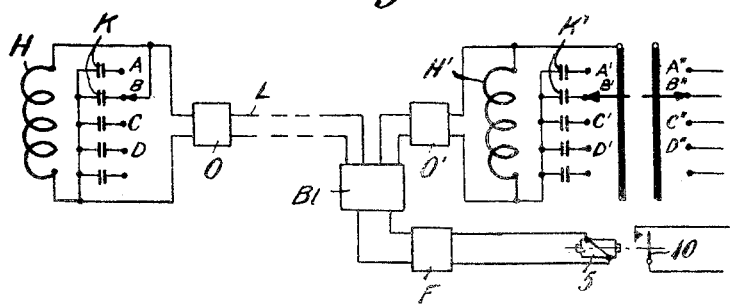

Furthermore, it is possible in connection with the invention to apply the heterodyne principle in such a manner as to bring the local oscillator disposed at the receiver to produce for each revolution of the selector a number of different frequencies which may form, through interference each with a corresponding one of the frequencies which may be sent out from the sender, one and the same sum or differential frequency, the receiver being then provided with a member tuned to said constant frequency or made selective in other manner. Figure 17 shows an embodiment of said kind. The sender is here designed in the same manner as in Figure 10. The receiver is provided with a local oscillator O' the frequency determining circuit of which is composed in the same manner as in the local oscillator O' in Figure 12. The signal oscillations incoming over the line L from the sender and the oscillations coming from the local oscillator O' are mixed in a modulator $B_1$ which is connected at its output side to the releasing relay 5 over a band filter F having a narrow frequency band comprising the said predetermined interference frequency. Since said frequency is produced only upon the occurrence of corresponding settings of the sender and the receiver, for instance in the setting positions B and B', and since all other modulation products of the modulator $B_1$ are blocked by the filter F, the releasing relay 5 will be actuated only during the moments when corresponding settings occur. The active modulation product, i. e. the interference frequency passed by the band filter F, should generally, with regard to the requisite building-up time of the filter, be selected the higher the more rapid the sequence of the characters is. In case of a great receiving speed it is therefore generally more suitable to use a sum frequency than a difference frequency.

In the connection according to Figure 17 the oscillator O' in combination with the modulator $B_1$ and the filter F may be considered as the selective tuning member at the receiver, which tuning member is selectively sensitive in each setting position of the contact arm 4 for a single corresponding sender frequency, namely the one which is capable to produce in the modulator the predetermined interference frequency corresponding to the filter F.

In Figure 3 is shown another arrangement for receipt based on interference. The releasing relay 5 is here, in the same manner as in Figure 16, arranged to release a printing roller which cooperates with a type wheel 20. The self-oscillating oscillator O' in Figure 17 is here replaced by a frequency generator operating with compelled oscillations, said frequency generator comprising a disk rotating at a constant speed and provided around its circumference with a series of photographic tone or sound records having individually constant but mutually different frequencies which increase or decrease by steps in the direction of rotation. At a point of its circumference the disk is transluminated by a narrow bundle of light from a source of light W which bundle of light after having passed the disk strikes a photo-electric cell connected to the modulator $B_1$. During the rotation of the disk the photo-electric cell V will thus produce in rapid sequence a series of continuous oscillations of a stepwise variable frequency, which oscillations are mixed in the modulator with the signal oscillations coming in from the line. The result will be the same as in the connection according to Figure 17, except that the oscillations produced locally are set up without any preparatory building-up operation. The printing operations are the same as in the arrangement according to Figure 16. An important advantage connected with a receipt based on interference is that the amplitude of the interference oscillations is independent of the incoming signal provided that said signal is amplified sufficiently.

In the embodiment hitherto described the highest possible telegraphing speed is limited by the condition that each one of the different settings at the receiver must be maintained for a sufficiently long time to permit the building-up of the corresponding frequency. A considerable increase in telegraphing speed can be obtained, however, by distributing the contacts A', B' . . . on two or more synchronously driven contact rows connected each to a variable oscillatory circuit. The different contact groups may then be alotted each to an appertaining releasing circuit, or else the arrangement may be such that the different groups of contacts are connected alternately to a common releasing circuit by means of separate distributing devices.

Figure 19:
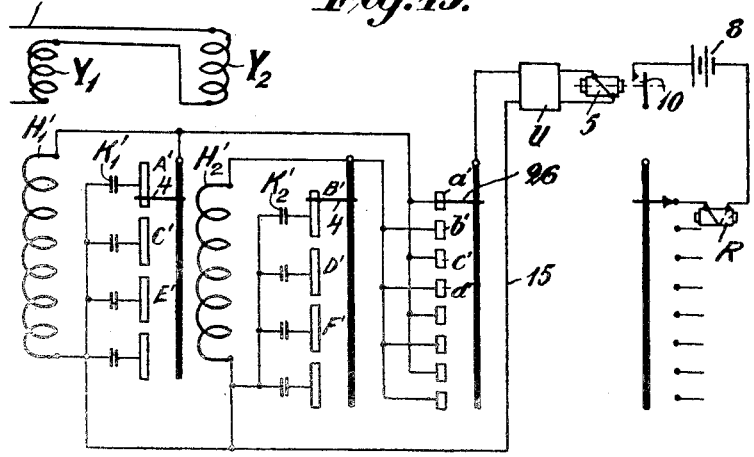

Figure 19 shows an embodiment of the last-mentioned kind. The receiver is here provided with resonance circuits $H_1'$, $K_1'$ and $H_2'$, $K_2'$ respectively, said resonance circuits being variable in steps and being loosely coupled to the line L each by means of an appertaining coil $Y_1$ and $Y_2$ respectively, each of said coils being tunable by means of its appertaining contact arm 4 in cooperation with the corresponding contact row A', C', E' . . . or B', D', F" . . . respectively. The tuning arrangement can be considered to have been derived from the one shown in Figure 17 by moving over every second contact, namely the contacts B', D', F" . . ., to the new row of contacts and by connecting said contacts together with the appertaining condensers $K_2'$ to the added coil $H_2'$ in such a manner that the same natural frequencies as before will be obtained in the different contact positons. The two contacts are displaced mutually in such a manner that the middle of each contact in each row of contacts is positioned right opposite a space between the contacts in the other row of contacts. The two oscillatory circuits $H_1'$, $K_1'$ and $H_2'$, $K_2'$ are connected alternately to the common indicating circuit 15 by means of a distributor consisting of a third contact arm 26 driven in synchronism with the other contact arms, and to a third row of contacts a', b', c' . . . swept over by said third contact arm 26, the length of the contacts in said third row of contacts being about half the length of the contacts in the two first mentioned rows of contacts and the first mentioned contacts being so distributed that each oscillatory circuit will be connected to the recording circuit only at the end of each contact closing in its row of contacts. In the setting position shown in the figure the contact A' appertaining to the first oscillatory circuit has been nearly passed by the appertaining contact arm 4 and the circuit is at this moment connected over a corresponding contact a' of the distributor to the releasing or indicating circuit 15. The other oscillatory circuit $H_2'$, $K_2'$ has just been closed over the contact B' but has not yet obtained connection to the releasing circuit. Before this happens it will have time to build up, so that when the contact arm 26 reaches the next contact b' of the distributor, thereby connecting the circuit $H_2'$, $K_2'$ to the releasing circuit, it will have obtained a sufficient amplitude of oscillations to be capable of immediately operating the relay 5. Said arrangement thus entails the advantage that, without any reduction of the time of contact in the different setting positions of the selector required for the building-up of the oscillations, it becomes possible to increase the number of different tunings and thus also the telegraphing speed. By distributing the contacts A', B', C' . . . on three or more groups while maintaining the number of contacts in each group it is evidently possible to treble or multiply the telegraph speed.

Another manner of increasing the telegraphing speed and the number of transmittable signs or characters is shown in Figure 20. In said connection there is used only one circuit H', K' capable of being tuned in steps, but the indicating members R are distributed on a number of different groups, in the shown example three groups designated $R_0$, $R_1$, $R_2$. The oscillatory circuit H', K' is assumed to be connected directly to the line L in parallel with the input sides of two band filter $F_1$, $F_2$ which at their output sides are connected through amplifiers $U_1$, $U_2$ each to an appertaining relay $X_1$, $X_2$ respectively, said band filters being so dimensioned as to be capable of passing each an appertaining one of two pilot frequencies which can be sent out alternatively together with anyone of the signal frequencies corresponding to the different settings of the circuit H', K' for the purpose of rendering it possible to direct the impulses from the relay group $R_0$ to one or the other of the relay groups $R_1$, $R_2$. Thus, if a signal frequency is received which is not accompanied by a pilot frequency the relay group $R_0$ is maintained connected to the releasing circuit 15 over the resting contacts of the relays $X_1$, $X_2$, the corresponding relay in the group $R_0$ being operated upon the occurrence of resonance in the circuit H', K'. If instead the same frequency comes in together with the pilot frequency corresponding to the filter $F_1$, which pilot frequency should be transmitted somewhat in advance, the relay group $R_1$ is connected instead through the operating contact of the relay $X_1$ to the releasing circuit, and if finally the frequency in question is combined with the other pilot frequency, i. e. the one corresponding to the filter $F_2$, the relay group $R_2$ will be connected up over the operating contact of the relay $X_2$. The number of different signs or characters obtainable is thus three times the number of the contacts A', B' . . . By increasing further the number of relay groups the number of transmittable different signals can be increased correspondingly.

Figure 18:
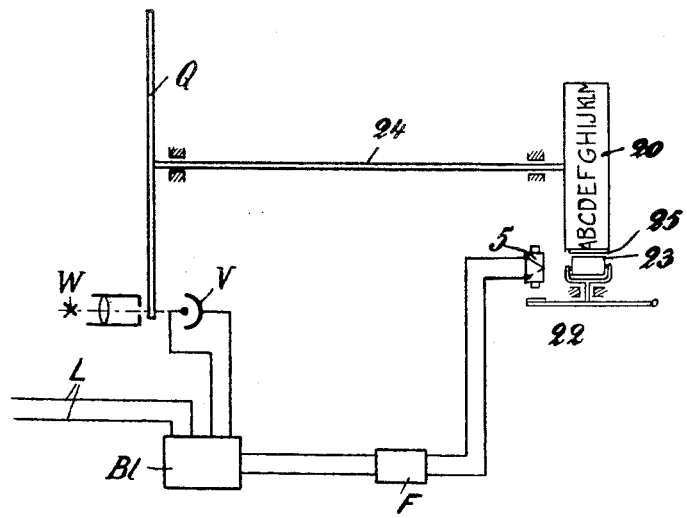

In the applications of the invention in type printing telegraphs or the like shown in Figures 16 and 18 a certain irregularity of printing may occur because of the fact that the building-up time for each frequency can vary somewhat according to the phase which the signalling frequency has at the moment when the corresponding contact in the contact row A', B', C' . . . is closed, whereby the letters may be printed in somewhat dislocated positions. Said inconvenience may be avoided by preventing the releasing circuit, by means of a separate relay device, from becoming closed until after the contact closing in the tuning circuit has ceased. Figure 21 shows an example of the use of such a correcting arrangement in the connection according to Figure 16. The amplifier U, which in Figure 16 is directly connected to the relay 5, is connected in Figure 21, if desired through a detector P, to two series-connected relays 28, 29, of which relays the last mentioned one is somewhat slow upon release. An opening contact of the relay 28 and a closing contact of the relay 29 are included in series in the circuit of the releasing relay 5, said circuit also containing a battery 8. When the oscillatory circuit H', K' is in resonance with the incoming signal, for example in the setting position C', both relays 28 and 29 are energized simultaneously to begin with, so that the circuit of the relay 5 will temporarily remain interrupted. At the moment when the contact arm 4 leaves the contact C' the relay 28 will be deenergized immediately, whereas the relay 29 will retain its armature attracted for a further brief moment during which the relay 5 gets time to become energized and to cause printing of the type C'' on the paper strip 25. In said arrangement the printing will always take place at the moment when the corresponding contact closing in the tuned circuit ceases, a perfectly regular printing of the letters being thus obtained. The correcting arrangement in question may also be used in any one of the embodiments described in order to secure indication of a certain signal in exactly the same angular position of the selector.

Another circuit arrangement for the same purpose is shown in Figure 22. The output circuit of the amplifier U branches off to two detectors $P_1$ and $P_2$. Said detectors are connected at their output sides each to an appertaining one of two resistances 35 and 32, said resistances being included in a loop in series with a glow-discharge lamp 30, a battery 31 the voltage of which lies somewhat below the ignition voltage of the glow-discharge lamp, a resistance 39, a relay 33, and an opening contact appertaining to the latter. The relay 5 is connected to the resistance 39 through a direct-current amplifier Z. The resistance 35 is shunted with a condenser 34. The mode of operation is the following: A resonance voltage set up in the oscillatory circuit H', K' and amplified by U charges the condenser 34 through the detector $P_1$ to a voltage which in the loop adds itself to the voltage of the battery 31. The part of the resonance oscillation rectified by the detector $P_2$ produces across the resistance 32 a voltage drop which is opposed to and of at least the same magnitude as the voltage across the condenser, so that the resulting voltage in the loop will still remain below the ignition voltage. At the moment when the resonance oscillation ceases at the end of the contact closing of the contact device A', B' ... the voltage drop across the resistance 32 will disappear immediately and the resulting voltage in the loop will rise above the ignition voltage, so that the glow-discharge lamp is ignited, passing current through the relay 33 and through the input resistance shunted across the amplifier 22. On account of the slow action of the relay upon release the releasing relay 5 will have time to operate, however, before the contact of the relay 33 is opened.

Figure 23:
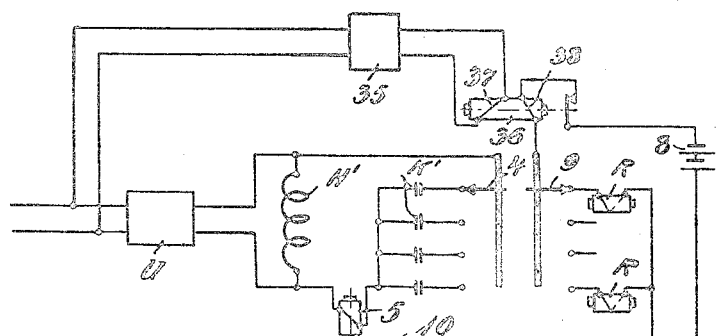

In such cases when the selector runs through its selecting range in uninterrupted repeated sequence it may occur that a signal transmitted from the sender will last longer than a complete revolution of the selector, so that if no precautions were taken one and the same sign could be repeated two or more times at the receiver. Such an unintentional repeating can be prevented by arranging the releasing circuit as shown in Figure 23 with an auxiliary relay 36 provided with two windings 37, 38, the first one of said windings being connected through an amplifier 35 directly to the line and the other one being included in the releasing circuit over an opening contact of the relay. The winding 37 connected to the line is so dimensioned that for each incoming signal it brings about a preparatory magnetization of the relay, said magnetization being in itself insufficient to attract the armature but sufficient to hold the same in attracted position. The auxiliary relay 36 is thus magnetically biased for each signal, but is brought to operate only when the tuning circuit H', K' gets into resonance with the signal, the armature being then attracted, opening the releasing circuit yet only after the indicating relay R corresponding to the signal has operated, whereafter the releasing circuit is kept open until the signal has ceased.

In order to be able to utilize in type printing telegraphing an increased receiving capacity obtained through any of the arrangements described above (interference arrangement, several groups of indicating members, frequency multiplying, et cetera) one may use a machine sender controlled, for instance, in known manner by a previously punched paper strip which is automatically moved past a row of contact springs connected each to an appertaining tuning condenser at the sender oscillator. By connecting said condensers in parallel it is possible to obtain for example with 5 condensers 32 different combinations or frequencies respectively.

An increased sending speed can also be obtained by using a plurality of key sets which are operated manually at the same time in combination with a distributor. The basic principle for said arrangement is that there is allotted to each key set an individual identifying frequency $v$ which is transmitted simultaneously with the signal frequency $n$ and, in some cases, also a special pilot frequency $f$. The distributor at the sender serves to connect the key sets alternatively to an oscillator set comprising oscillators for the different groups of frequencies.

Figure 24:
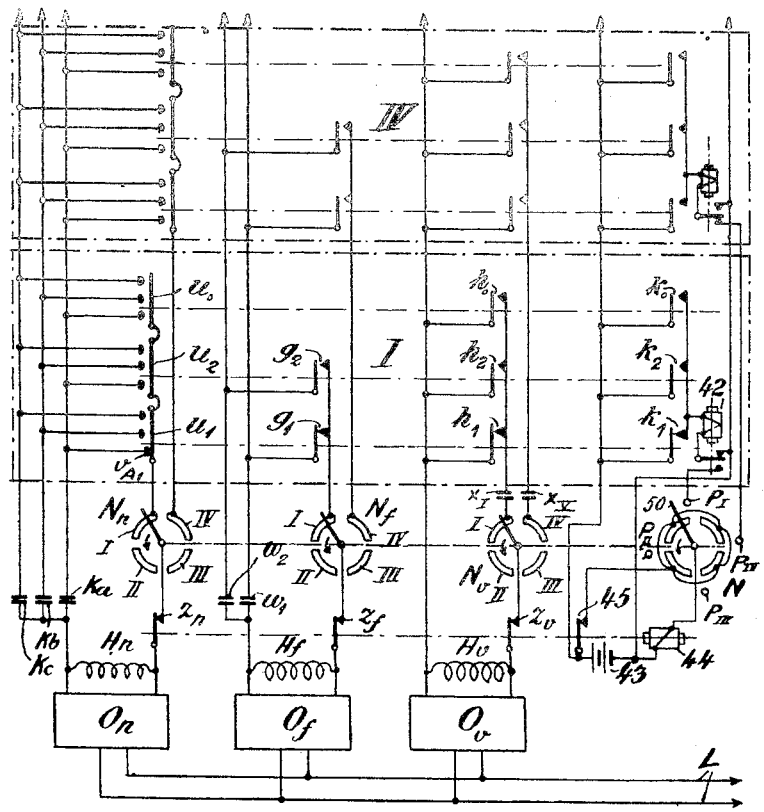

Figure 24 shows an example of such a distributor arrangement in which four sending key sets may be operated simultaneously, the contact arrangements for two of the sets only being shown on the drawings where they are designated with I and IV. The distributors are provided with synchronously driven contact arms. If said arms occupy the positions shown in the figure, and if the relay 44 is assumed to be energized, the depressing of any of the keys of the key set I will cause closing of the tuning circuits of the three oscillators $O_n$, $O_f$, $O_v$. The oscillator $O_v$ will then transmit the signal frequency $n$, the oscillator $O_f$, the pilot frequency $f$, and the oscillator $O_v$ the identifying frequency $v$.

The keys, of which nine only are shown in Figure 24, are divided into three groups. The keys in the first group are adapted to engage and bring about contact closing at a contact bar $u_1$. Said contact bar in turn is capable of closing the contacts $g_1$, $h_1$ and $k_1$. In the same manner the keys in the second and in the third group respectively actuate the contact bars $u_2$ and $u_3$ respectively. If the key $v_{A1}$, for instance, is depressed the tuning condenser $K_a$ is connected to the tuning inductance $H_n$ at the oscillator $O_n$ over $v_{A1}$, the sector I of the distributor $N_n$ and the relay contact $z_n$. There is then sent out on the line a frequency corresponding to the magnitude of the condenser $K_a$ connected into circuit. The bar $u_1$ in turn closes the contact $g_1$, whereby the condensers $w_1$ is connected over the contact $g_1$, the sector I in the distributor $N_f$, and the contact $z_f$ to an inductance $H_f$. The frequency of the oscillator $O_f$ is then changed in accordance with the value of $w_1$. At the same time also the condenser $x_1$ is connected over the contact $h_1$, the sector I of the distributor $N_v$ and the contact $z_v$ to the tuning circuit of the oscillator $O_v$, which sends out a frequency corresponding to $x_1$. The bar $u_1$ also causes closing of $k_1$. If the relay 42 is not energized, the contact $p_1$ in the distributor N is then connected to one pole of the battery 43. When the arm of the distributor N during its movement engages with $p_1$, the current through the winding of the relay 44 is closed. Said relay operates, closing its holding contact 45 over which it obtains holding current from the battery 43 over the sector I of the distributor N. When the distributor arm 50 has passed the sector I the circuit is interrupted and the relay 44 is de-energized.

At the moment when the arm 50 made contact with $p_1$ and the circuit through the relay 44 was closed the relay 42, which preferably is a slow-upon-operation relay, was also energized connecting itself over its operating contact to the battery 43, thus obtaining holding current which holds the relay armature attracted as long as $k_1$ is kept closed. Since in reality the function of the relay 42 is the same as that of the relay 36 in Figure 23, even the first mentioned relay may be made with two windings.

The purpose of the distributor N and of the relay 42 is to prevent operation of the relay 44 in any other position of the distributor arm 50 when said arm is in contact with $p_1$. With this arrangement some one of the keys of the set I must already be depressed when the arm makes contact with $p_1$ in order that the three frequencies shall be transmitted during the whole time while the arm 50 is in contact with the sector I, provided that the key $v_{A1}$ is kept depressed at least during said time.

On operation of the relay 42 the connection to $p_1$ at the shifting contact of the relay was interrupted and said contact is kept open as long as $k_1$ is closed. This arrangement insures that, independently of the time during which the key $v_{A1}$ of the set I is depressed, the relay 44 will be operated only once for each depression of a key and during just the time required by the arm 50 for moving across the sector I.

If at a certain moment a key should be depressed in each key set the distributor provides for successive connection of three and three of the condensers selected by the positions of the keys in the respective sets to the corresponding tuning inductances in the three oscillators. Said oscillators will therefore successively transmit four groups of frequencies, each group consisting of three different frequencies.

The receiver, which is shown in Figure 7, is here constructed on the interference principle and provided in accordance with Figure 18 with a tone disk Q and with a type wheel 20. Four printing relays 5 corresponding each to an appertaining key set at the sender are arranged along the periphery of the type wheel 20, only the printing relays I and IV being shown on the drawings. The types are placed in three rows. The connection into circuit of the windings of the relays 5 is effected by the relays 1, said relays being connected to the line through filters $F_1$ and $F_{IV}$. Said filters are tuned each to an appertaining one of the frequencies $v$ which the oscillator $O_v$ is capable of transmitting.

If therefore the frequency $f_1$, which is produced upon connection of $K_a$ to $H_n$, comes in from the line, the relay 1 connected to the filter $F_1$ will be energized, connecting the printing relay 5 appertaining to the printing arrangement I over the contact 46 to the filter F. The relay 1 closes at the same time the contacts 47 and 48, the relays $X_1$ and $X_2$ being then connected to the filters $F_1$ and $F_2$ respectively. The incoming frequency $f_1$, which is produced when the condenser $w_1$ is connected to the inductance $H_f$, energizes the relay $X_1$. Said relay then shifts the printing roller 23 together with the paper strip in the printing arrangement I to the first row of types on the type wheel 20. In this manner the printing arrangement has now been brought to printing position with respect to the correct row of types and it is now prepared to make a print on the paper strip when the type wheel arrives in the position corresponding to the transmitted frequency $f_1$.

Alternatively there is connected between the filter F and the mixing aggregate $B_1$ a frequency multiplying arrangement 49, said arrangement serving to secure a sufficiently great receiving capacity if only one frequency disk is used, as already mentioned. The speed of rotation of the frequency disk Q must be so great that the frequency disk gets time to turn at least one revolution in the time during which the distributor arms are in contact with each other.

I claim:

1. An electric remote control system comprising, a sender, a receiver, adjustable selective means at the sender, selector means at the receiver, means for adjusting the selector means at the receiver successively to different selected positions corresponding to one of the selected positions at the sender, a plurality of indicating means, means movable in synchronism with the adjustment of the selector means at the receiver for selecting one of said indicating means, a circuit including a source of current connecting the sender with the receiver, and means responsive to the flow of a predetermined current in said circuit for rendering the selected indicating means operative.

2. An electric remote control system comprising, a sender, a receiver, adjustable selective means at the sender, selector means at the receiver, means for adjusting the selector means at the receiver successively to different selected positions corresponding to one of the selected positions at the sender, a plurality of indicating means, means movable in synchronism with the adjustment of the selector means at the receiver for selecting one of said indicating means, a circuit including a source of current connecting the sender with the receiver, means responsive to the flow of a predetermined current in said circuit for rendering the selected indicating means operative, and means for rendering the other indicating means inoperative upon further movement of said movable means.

3. An electric remote control system comprising, a sender, a receiver, adjustable selective means at the sender, selector means at the receiver, means for adjusting the selector means at the receiver successively to different selected positions corresponding to one of the selected positions at the sender, a plurality of indicating means, means movable in synchronism with the adjustment of the selector means at the receiver for selecting one of said indicating means, a circuit including a source of current connecting the sender with the receiver, a second circuit including all of said indicating means, a source of current for the second circuit, and a relay in the first circuit responsive to a predetermined flow of current therein for closing the second circuit whereby the selected indicating means is operated.

4. An electric remote control system comprising, a sender, a receiver, adjustable selective means at the sender, selector means at the receiver, means for adjusting the selector means at the receiver successively to different selected positions corresponding to one of the selected positions at the sender, a plurality of indicating means, means movable in synchronism with the adjustment of the selector means at the receiver for selecting one of said indicating means, a circuit including a source of current connecting the sender with the receiver, a second circuit including all of said indicating means, a source of current for the second circuit, a relay in the first circuit responsive to a predetermined flow of current therein for closing the second circuit whereby the selected indicating means is operated, and a second relay in the first circuit for opening the second circuit.

5. An electric remote control system comprising, a sender, a receiver, adjustable selective means at the sender, selector means at the receiver, means for adjusting the selector means at the receiver successively to different selected positions corresponding to one of the selected positions at the sender, a plurality of indicating means, means movable in synchronism with the adjustment of the selector means at the receiver for selecting one of said indicating means, a circuit including a source of current connecting the sender with the receiver, a second circuit including all of said indicating means, a source of current for the second circuit, a relay in the first circuit responsive to a predetermined flow of current therein for closing the second circuit whereby the selected indicating means is operated, and means actuated upon operation of the selected indicating means opening the second circuit.

SVEN ANDERS JANSSON.